(12) United States Patent
Maurer

(10) Patent No.: US 8,527,084 B2
(45) Date of Patent: Sep. 3, 2013

(54) METHOD FOR CUTTING A MATERIAL LAYER BY MEANS OF A CUTTING BEAM

(75) Inventor: Walter Maurer, Oftringen (CH)

(73) Assignee: Micromachining AG, Aarwangen (CH)

(*) Notice: Subject to any disclaimer, the term of this patent is extended or adjusted under 35 U.S.C. 154(b) by 253 days.

(21) Appl. No.: 12/966,754

(22) Filed: Dec. 13, 2010

(65) Prior Publication Data

US 2011/0147347 A1 Jun. 23, 2011

(30) Foreign Application Priority Data

Dec. 17, 2009 (CH) .................................... 1937/09

(51) Int. Cl.
*G06F 9/00* (2006.01)
*G06F 19/00* (2011.01)

(52) U.S. Cl.
USPC ............ 700/160; 83/177; 83/72; 219/121.67; 219/121.72; 219/68; 219/121.59; 700/166

(58) Field of Classification Search
USPC .................. 83/177, 72; 700/159, 160, 166, 700/162, 170, 173; 451/91, 92; 219/121.67, 219/121.72, 68, 121.59
See application file for complete search history.

(56) References Cited

U.S. PATENT DOCUMENTS

| | | | |
|---|---|---|---|
| 5,585,018 A | 12/1996 | Kanaoka et al. | |
| 5,609,284 A | 3/1997 | Kondratenko | |
| 5,620,414 A * | 4/1997 | Campbell, Jr. | 604/22 |
| 6,766,216 B2 | 7/2004 | Erichsen et al. | |
| 6,922,605 B1 | 7/2005 | Olsen | |

FOREIGN PATENT DOCUMENTS

JP 05019825 A 1/1993

OTHER PUBLICATIONS

Swiss Search Report, dated Mar. 30, 2010, from corresponding Swiss application.

* cited by examiner

*Primary Examiner* — Samuel M Heinrich
(74) *Attorney, Agent, or Firm* — Young & Thompson

(57) ABSTRACT

In the method for cutting a material layer (20) along a given cutting line (21), a cutting beam is moved so as to impinge on the material layer (20) laterally offset by a distance (W) from the cutting line (21). The distance (W) is determined as a function of the variations of the cutting speed at which the cutting beam is moved, and/or as a function of the deviations of the effective cutting beam cross-section from a circular shape.

17 Claims, 6 Drawing Sheets ent invention to provide a method
METHOD FOR CUTTING A MATERIAL LAYER BY MEANS OF A CUTTING BEAM

FIELD OF THE INVENTION

The present invention relates to a method for cutting a material layer along a predetermined cutting line by means of a cutting beam and a cutting device, which is configured to implement such a method.

BACKGROUND OF THE INVENTION

The cutting beam may e.g. be in the form of a fluid jet or a laser beam (with regard to waterjet cutting, see e.g. patent specifications U.S. Pat. No. 6,766,216 B2 or U.S. Pat. No. 6,922,605 B1). The cutting beam that forms when leaving the cutting head has no fixed geometry, but represents a kind of dynamic tool, whose impact on the material layer to be cut may vary over time.

For positioning the cutting beam with respect to a cutting line, along which a particular material layer is to be cut, it is known to consider the cross-section of the cutting beam as being circular and invariable. However, this conception restricts the limits of the accuracy with which a material layer can be cut. This model is not suitable for a very accurate cutting.

SUMMARY OF THE INVENTION

It is an object of the present invention to provide a method that allows accurate cutting of a material layer by means of a cutting beam.

This object is attained by a method for cutting a material layer along a predetermined cutting line by means of a cutting beam, which during the cutting process is moved such that it impinges on the material layer laterally offset by a distance from the cutting line.

The distance is determined as a function of the variations of the cutting speed at which the cutting beam is moved and/or as a function of the deviations of the effective cross-section of the cutting beam from a circular shape. This allows an accurate cutting of the material layer.

BRIEF DESCRIPTION OF THE DRAWINGS

The invention is explained hereinafter by means of exemplary embodiments with reference to figures, in which.

DETAILED DESCRIPTION OF THE PREFERRED EMBODIMENTS

Figure 1:
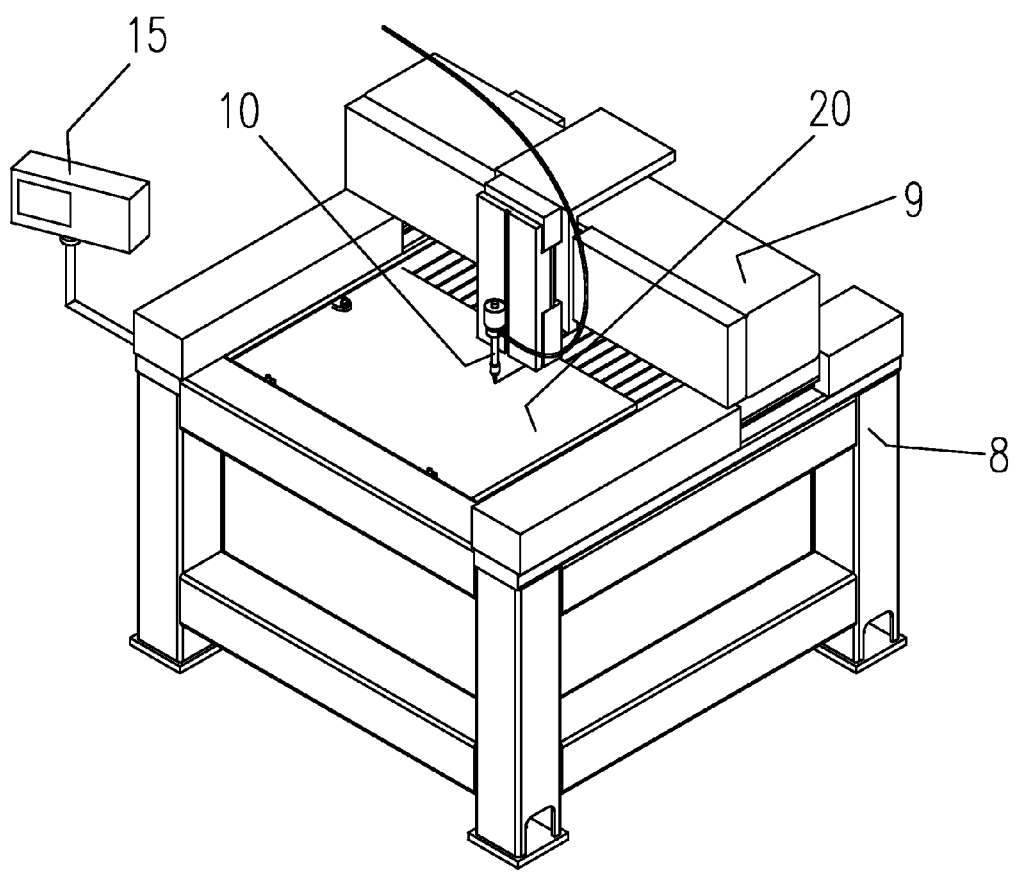
FIG. 1 shows a perspective view of a cutting device according to the invention.

FIG. 1 shows a cutting device having a frame 8, which stands on the floor and on which a displaceable bridge 9 is arranged. On the latter, a cutting head 10 is arranged that is displaceable transversally to bridge 9 and thus movable in the plane and vertically thereto. Cutting head 10 is controlled by a control unit 15, e.g. a numerical control in the form of a CNC control unit.

In the cutting process, a cutting beam is discharged from cutting head 10 by means of which a material layer 20 in the form of a workpiece is cut apart. Suitable cutting beams are e.g. the following types: waterjet of pure water for pure water cutting or of water with added abrasive material for abrasive water cutting, a beam formed of another liquid or also a beam formed of another medium, e.g. a laser beam, a plasma beam, a torch cutting beam, etc. The cutting device is equipped with the usual components for producing the corresponding cutting beam.

Control unit 15 comprises usual devices for the input and output of information such as a keyboard, monitor, and/or pointing device (e.g. a touchscreen), etc., and means for data processing and for generating control signals which in operation produce a movement of cutting head 10. Preferably, these means include a computer having a central processing unit (CPU) and a memory, e.g. in the form of a random access memory (RAM), and/or a hard disk.

Figure 2:
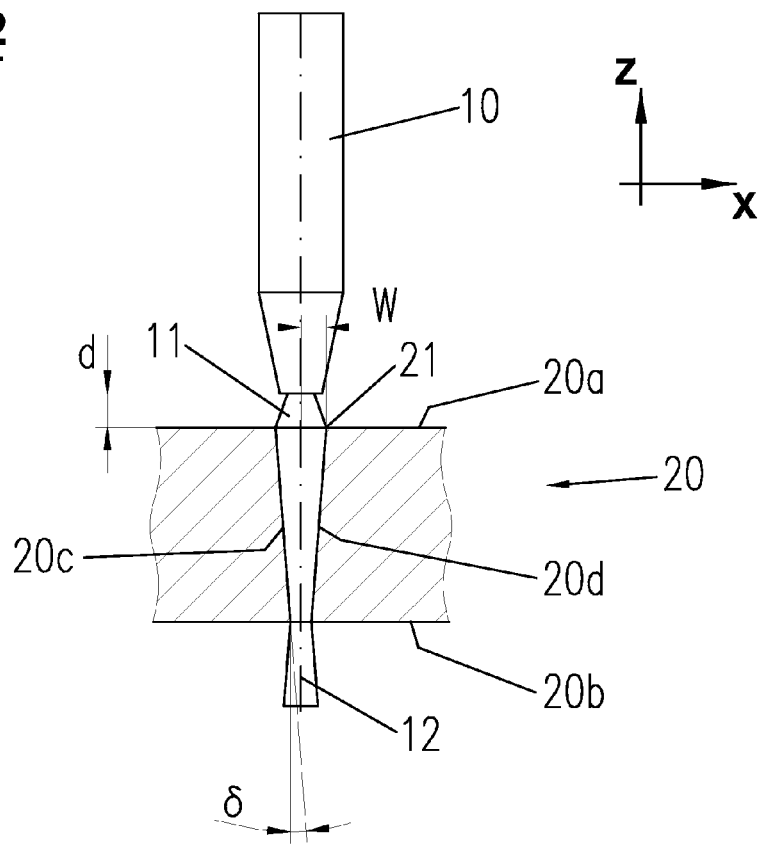
FIG. 2 shows a partly sectioned lateral view of a material layer that is being cut by means of a cutting device according to FIG. 1.

FIG. 2 schematically shows a cutting beam 11 that is discharged from a focusing tube of the head 10 and propagates in the propagation direction 12. Cutting beam 11 impinges on the upper side 20a of material layer 20, penetrates the latter, and exits on the underside 20b of material layer 20.

In the sectional view of FIG. 2, the predetermined cutting line 21 along which the material layer is to be cut is merely visible as a point. Cutting beam 11, which has an extension transversally to propagation direction 12, is laterally offset from cutting line 21 by a distance W. Thus, in material layer 20, a cutting edge is formed that follows the desired cutting line 21.

The value that is to be chosen for the distance W depends on the momentary geometrical shape of cutting beam 11. On the one hand, the effective cross-section, which the cutting beam 11 has when impinging on the material layer 20, may deviate from a circular disk. On the other hand, the cross-sectional area of cutting beam 11 impinging on the material layer is dependent on the cutting speed (also called feed rate) of cutting beam 11. These two possibilities are explained in more detail in the following sections A) and B):

A) Noncircular Shape of Cutting Beam

In the context of the present invention it has been found that cutting beam 11 as it is e.g. produced in pure waterjet cutting or abrasive waterjet cutting may deviate from a circular shape when seen in the cross-section perpendicular to the propagation direction 12. Such a noncircular shape may e.g. result from the fact that after a prolonged period of operation, cutting head 10 may be subject to locally irregular wear. For instance, the cutting head 10 for waterjet cutting has a focusing tube 10a (cf. FIG. 10), from which the cutting jet 11 is discharged and which is subject to wear. This wear may be asymmetrical, in particular for abrasive water cutting when e.g. the abrasive particles are fed laterally to the cutting head 10 and thus the cutting jet cross-section is charged with abrasive particles in an geometrically unhomogeneous manner.

It is also possible that at the production of the cutting head already, in particular when the focusing tube 10a is produced, deviations from the circular shape occur, e.g. due to manufacturing tolerances, and thus the effective cross-section of the cutting jet is not circular.

Figure 10:
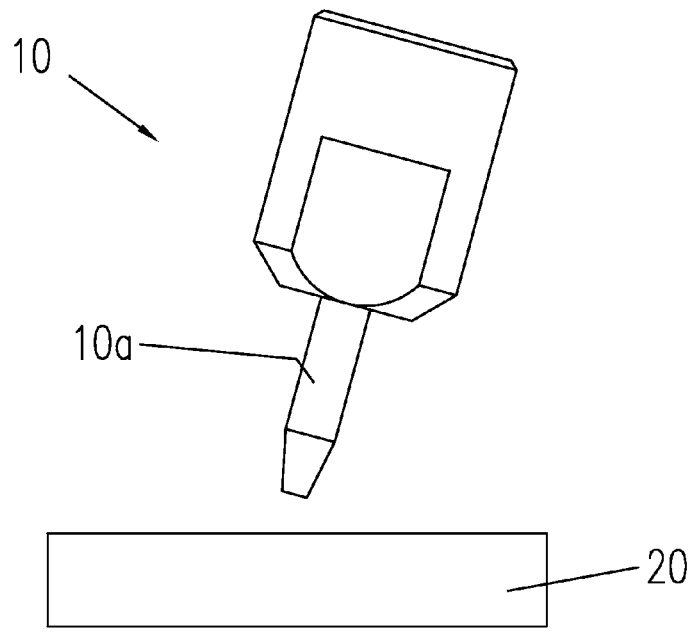
FIG. 10 shows a side view of a variant of a cutting device having an inclined cutting head.
Figure 11:
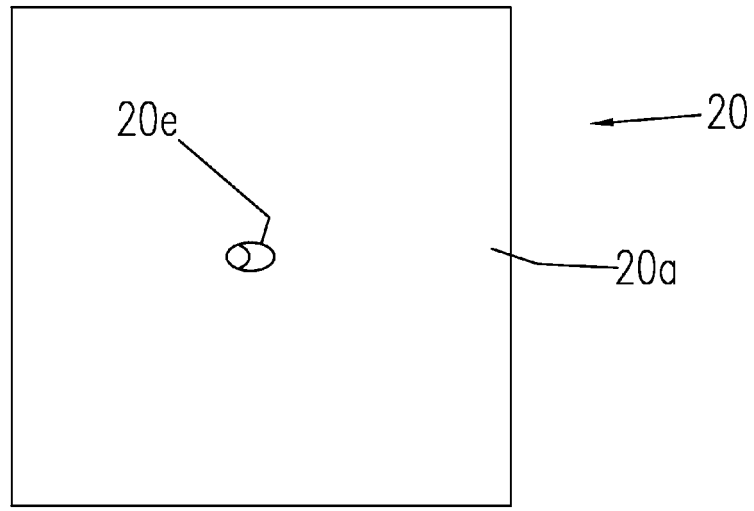
FIG. 11 shows a top view of a workpiece, in which a hole has been produced by means of the cutting device according to FIG. 10.

A noncircular shape of the effective cross-section of the cutting beam 11 may also result when the cutting head 10 is in an inclined position:

If the cutting beam 11 shown in FIG. 2 is displaced too fast or too slowly, then normally a kerf with non-parallel cutting edges is formed. Thus, the cutting edges have an inclination 6 with respect to the perpendicular to the surface 20a of the workpiece 20 (cf. FIG. 2). This inclination is also designated as "taper". If, during the cutting process, the cutting head 10 is tilted with respect to the vertical direction (cf. FIG. 10), the taper of at least one of the cutting edges 20c, 20d can be compensated. The tilting of the cutting head 10 has however the effect that the cutting beam 11 impinges on the workpiece 20 with a noncircular cross-section, even if the cutting beam 11 is circular when seen perpendicular to the propagation direction. FIG. 11 shows an example of a workpiece 20, in which a hole 20e has been produced with a cutting head 10 being in a inclined position as shown in FIG. 10. As can be seen, the hole 20e has a noncircular shape.

The deviations of the cutting beam 11 from a circular shape discussed above can be taken into account as follows:

In a first step, the current geometrical shape of cutting beam 11 is determined by means of a measuring method, e.g. by using an optical device. It is also possible to produce one or several test holes in a material layer 20 by means of cutting beam 11 and to measure the resulting shape. If the cutting head 10 is tiltable, different inclination angles may be chosen to produce the test holes.

Subsequently, an ellipse 11' is fitted to the measured shape e.g. using the least squares method or another suitable mathematical approximation method. In this manner, the following parameters result (see FIG. 3): the position of the point of origin U of ellipse 11' relative to a given coordinate system X, Y, Z, the length of the major axis a as well as of the minor axis b, and the angle α about which ellipse 11' is rotated relative to one of the axes, e.g. the X axis.

Figure 3:
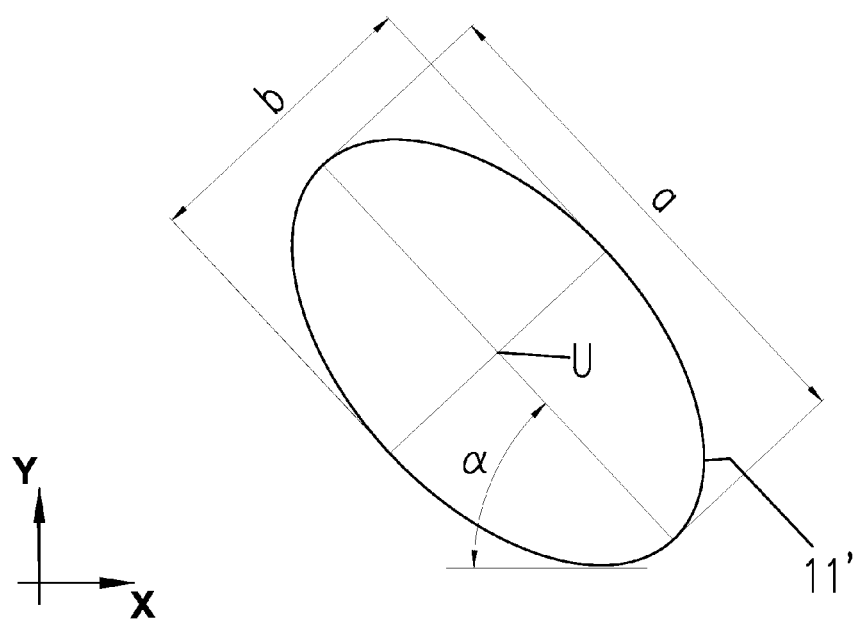
FIG. 3 shows an exemplary embodiment of a cross-sectional shape that represents the cutting beam geometry.

Besides the measurements mentioned above, it also possible to use empirical models in order to determine for instance a temporal variation of the ellipse parameters shown in FIG. 3. For instance, one can take into account that the angle α may change in time, e.g. when the interior geometry of the focusing tube 10a changes due to wear. If the cutting head 10 is arranged in an inclined position and/or is rotatable, then the empirical models can also been used to determine the ellipse parameters as a function of the rotation angle and/or the tilting angle.

Figure 4:
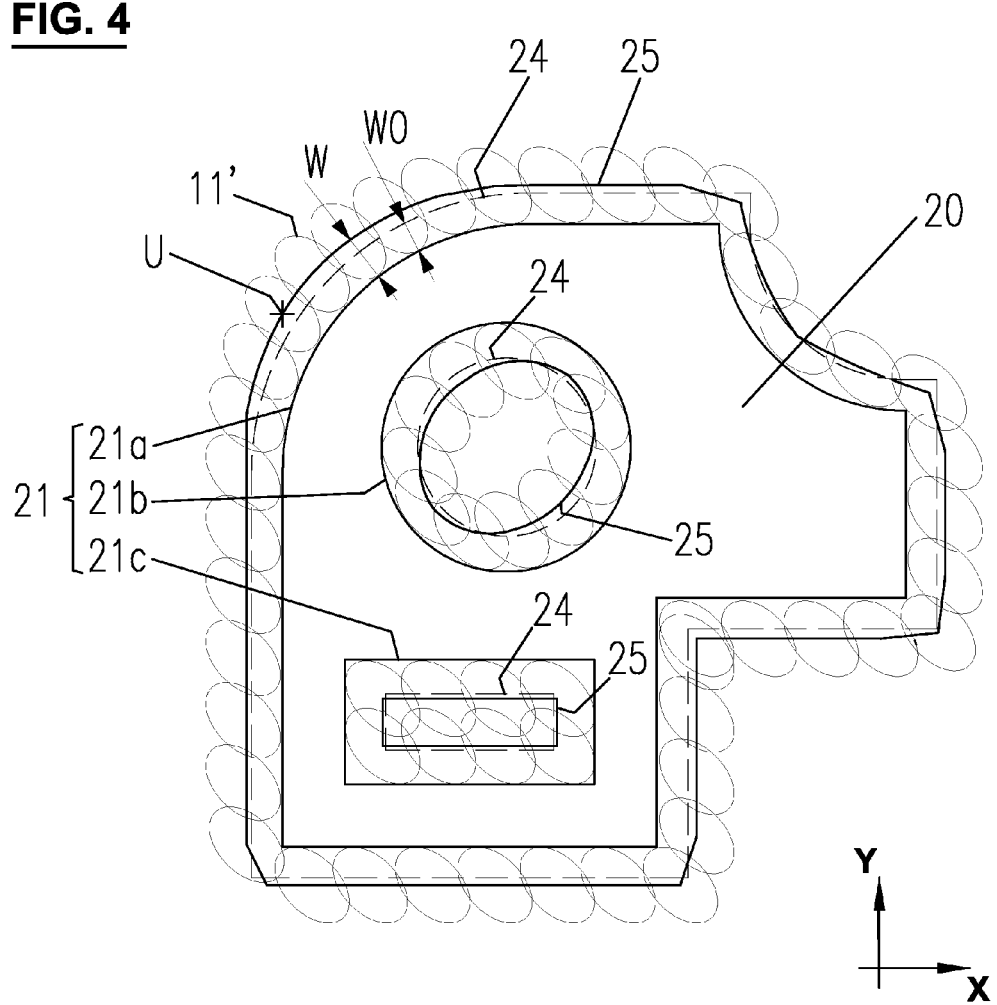
FIG. 4 shows a top view of a workpiece being cut using the exemplary embodiment according to FIG. 3, wherein the working path modified according to the invention is also indicated.

FIG. 4 shows an example of a piece 20 having a particular shape that is to be cut out of a material layer. The contour 21 defines the shape of the surface which the piece 20 is to have on the upper side. In the present example, piece 20 has two cutouts so that contour 21 is composed of an outer contour 21a and of two inner contours 21b and 21c.

Data defining contour 21 as well as data relating to parameters a, b, α, U of fitted ellipse 11' are forwarded to control unit 15. By means of a program, the control unit 15 calculates the distance W by which cutting beam 11, i.e. the point of origin U is to be laterally offset from contour 21 in order that fitted ellipse 11' is adjacent to contour 21. The calculation of W may e.g. be performed as a function of the distance S that cutting beam 11 has traveled from the starting point as it is moved along contour 21. In FIG. 4, the ellipses 11' are depicted at different locations. In the present example, the cutting device is arranged so that cutting head 10 maintains its orientation while it is being moved in the plane. Consequently, the angle α remains the same.

Solid line 25 in FIG. 4 defines the path of the point of origin U and thus the respective distance W. It is visible that W varies as cutting beam 11 is displaced along contour 21. For comparison, dashed line 24 shows the path of the point of origin that would result with a constant circular cross-section of cutting beam 11 and thus would have a constant distance W0 from contour 24. In the field of control technology, this constant distance W0 is also known as "tool radius correction". The difference between the two lines 24 and 25 reflects the increased accuracy with which part 20 is cut.

Figure 5:
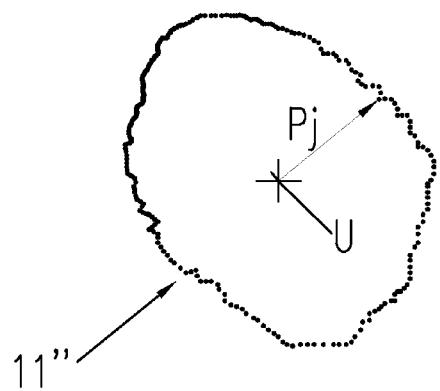
FIG. 5 shows another exemplary embodiment of a cross-sectional shape that represents the cutting beam geometry.

For a further increased accuracy it may be contemplated instead of an ellipse to mathematically map the measured shape of cutting beam 11 to another geometrical shape that is characterized by more parameters than an ellipse has. For example, a sequence of N points Pj may be assigned to the measured shape of cutting beam 11, each point Pj being defined by its coordinates with respect to the point of origin U (see FIG. 5). Together, points Pj thus form a sort of point cloud 11". Each point Pj is e.g. determined so as to lie on the contour of the measured shape of cutting beam 11.

To calculate the distance W, the parameters defining point cloud 11" are forwarded to control unit 15 and processed by the program together with the data of the contour 21 that is to be cut.

B) Variable Cutting Beam Removal

Besides a noncircular shape of the cutting beam cross-section, an inaccurate cut may also result when the geometrically effective shape of cutting beam 11 varies due to a variation of the cutting speed V at which it is being moved. The impact of the cutting beam on a material layer, as it is moved transversally to the upper surface of the material layer with speed V, may vary when V is varied, even if e.g. the distance between the cutting head and the upper surface remains constant (cf. FIG. 2, where this distance is designated as working distance d). Hereinafter, the piercing point of the propagation direction 12 of cutting beam 11 with the upper surface 20a of material layer 20 (cf. FIG. 2) is also called the zero point of cutting beam 11.

Figure 6:
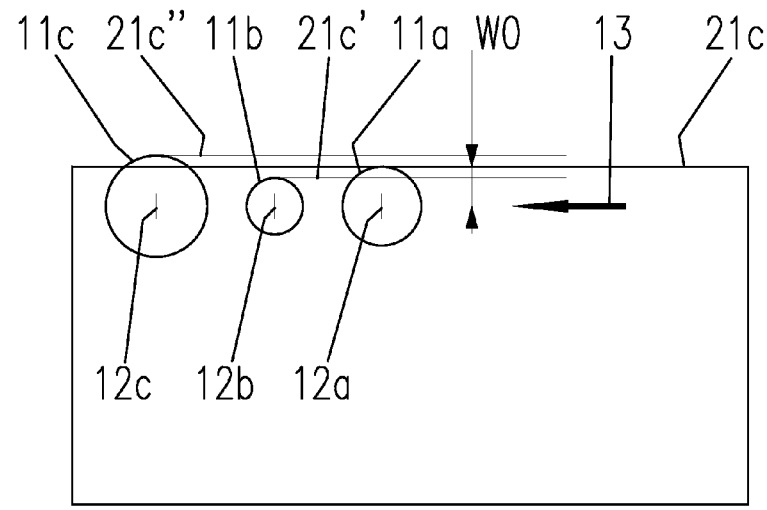
FIG. 6 shows the geometrical impact of the cutting beam upon a workpiece for three different cutting speeds.

FIG. 6 shows an example where an inner contour 21c is cut at three different cutting speeds:

If cutting beam 11a is moved in direction 13 at the optimum cutting speed V0, then the cutting beam 11a is adjacent to the desired cutting line 21c and cutting edges result which, in contrast to the cutting edges 20c and 20d shown in FIG. 2, are parallel. The distance between zero point 12a of cutting beam 11a and cutting line 21c is equal to W0 and corresponds to half of the kerf width.

If cutting beam 11b is moved at a cutting speed that is greater than V0, then the material removal by the cutting beam 11b in the area of the beam entry is reduced. The result is a cutting line 21c' that is inwardly offset from the desired cutting line 21c. To perform the cut along the desired cutting line 21c, the distance between cutting line 21c and zero point 12b of cutting beam 11b has to be chosen smaller than W0.

If cutting beam 11c is moved at a cutting speed that is smaller than V0, then the material removal by the cutting beam 11c in the area of the beam entry is increased. The result is a cutting line 21c" that is outwardly offset from the desired cutting line 21c. To perform the cut along the desired cutting line 21c, the distance between cutting line 21c and zero point 12c of cutting beam 11c has to be chosen greater than W0.

The relationship between the cutting speed V and the selection of the corresponding distance W at which the cutting beam is to be positioned laterally of the desired cutting line so that the cut is performed along this cutting line can be determined by means of empirical models. Alternatively, it may be contemplated to establish the relationship experimentally. To this end, cuts are produced in a workpiece of the type that is to be machined at different cutting speeds, and the width of the respective kerf that results on the upper surface of the workpiece and corresponds to two times W is measured.

The data of V and the corresponding W are forwarded to control unit 15 e.g. in table form or alternatively in the form of a fitted function and stored there. Together with the data defining the contour that is to be cut, by means of a program, control unit 15 computes the distance W by which cutting beam 11 is to be laterally offset from the contour so that the cut contour corresponds to the desired contour.

Figure 7:
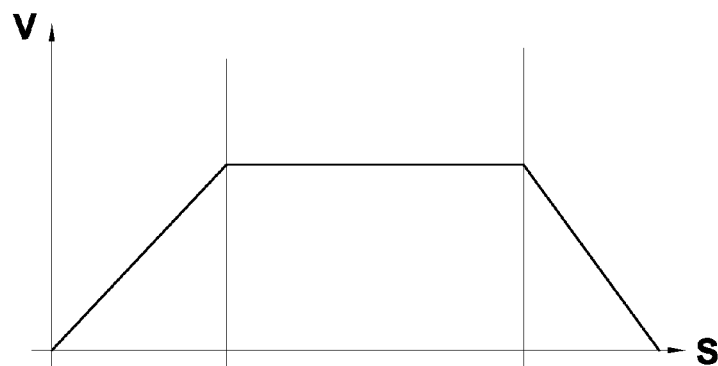
FIG. 7 shows an example of the progression of the cutting speed V, at which the cutting beam is moved along a cutting line, wherein S is the distance traveled from a starting point.
Figure 8:
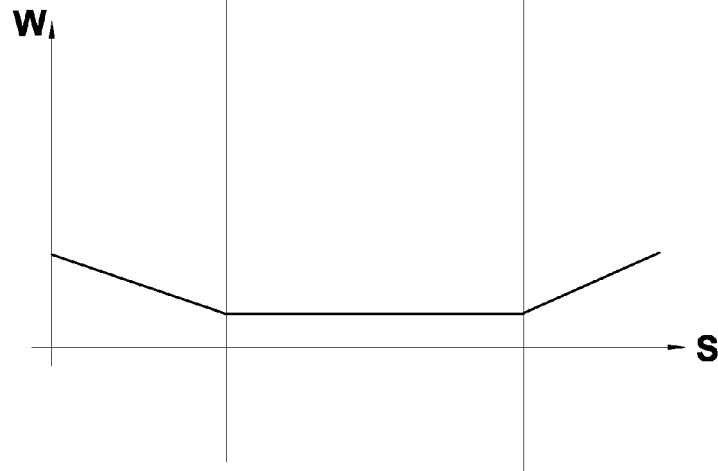
FIG. 8 shows the progression corresponding to FIG. 7 of the distance W between the cutting beam and the cutting line in function of S.

FIGS. 7 and 8 show an example of V and the corresponding W as a function of the distance S that cutting beam 11 has traveled from the starting point in the moving direction of the cutting head 10. In this example, cutting beam 11 is accelerated at the beginning in the moving direction 13 and W is therefore reduced. Subsequently, it is moved at a constant maximum cutting speed and W is correspondingly kept at a constant minimum value. Ultimately, it is slowed down and W is correspondingly increased.

Figure 9:
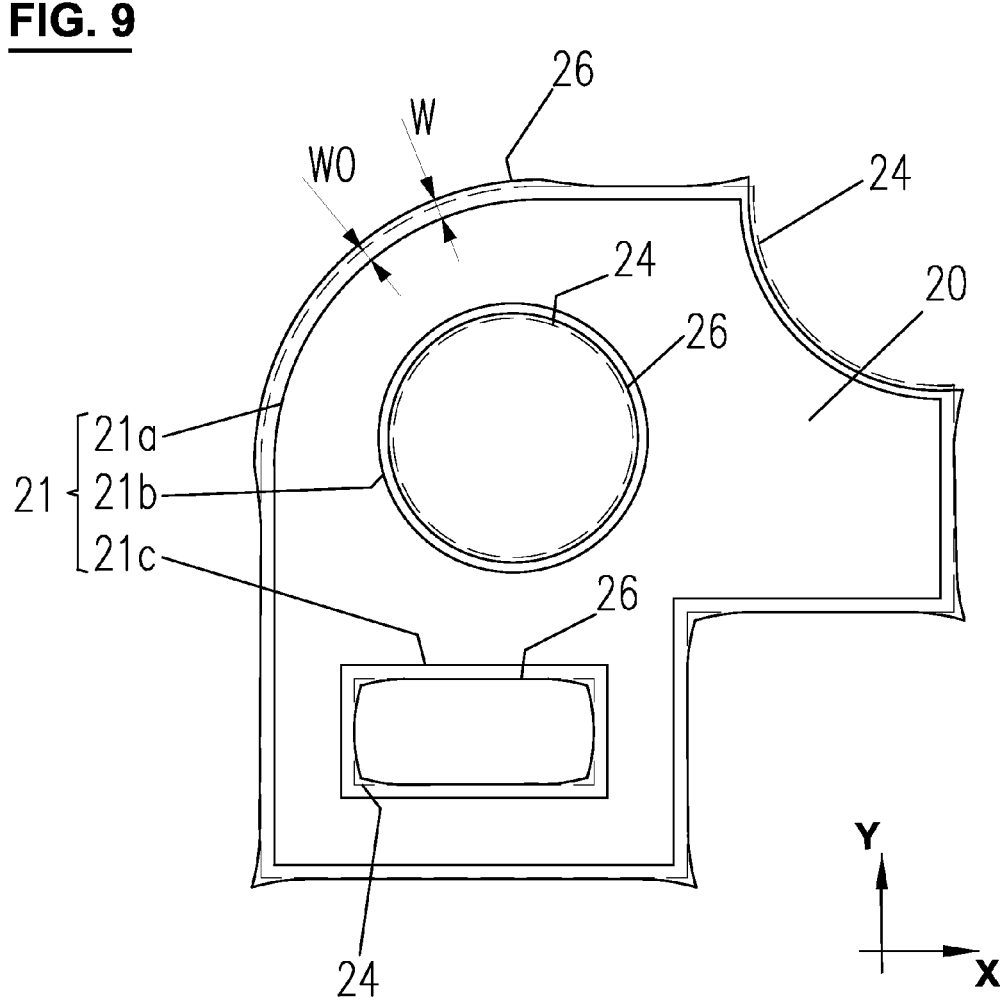
FIG. 9 shows a top view of a workpiece that is being cut by means of a cutting beam when W is determined as a function of V.

FIG. 9 shows the example of workpiece 20 from FIG. 4 whose shape is defined by contour 21 which is composed of outer contour 21a and the two inner contours 21b and 21c. Dashed line 24 corresponds to the path of the zero point of cutting beam 11, when there is a constant value W0 of the distance from contour 21 as well as a constant working distance d.

Solid line 26 corresponds to the corrected path of cutting beam 11 where the distance W is adapted to the current cutting speed V. The difference between the two paths 24 and 26 represents the correction K that is set with respect to constant value W0, where K=W−W0, and corresponds to the improvement in the local accuracy with which workpiece 20 is cut at the respective points of the working path.

In the present example, cutting beam 11 is moved at the same cutting speed V on the straight sections of contour 21 so that the correction is K=0 in those sections. If the direction of cutting beam 11 changes, however, V varies. The distance W is correspondingly adapted so that the correction K is positive or negative (cf. the difference between paths 24 and 26 at the corners and along the curved lines of contour 21).

The program for computing the movement of cutting head 10 and of cutting beam 11 in time, mentioned in sections A) and B) above, may e.g. be stored in control unit 15 and run before the cutting process. It may also be contemplated to run the program on an external computer system and to transmit the computed data to control unit 15 subsequently. Furthermore it may be contemplated to design the control unit such that the movement of cutting head 10 is continuously computed during the cutting process.

From the preceding description, numerous modifications are accessible to one skilled in the art without departing from the scope of protection of the invention that is defined by the claims.

Thus it may be contemplated to design the program for computing the movement of the cutting beam in time in such a manner that both corrections described in the preceding sections A) and B) are taken into account for computing the distance W so as to be able to achieve a particularly accurate cut of the cutting beam along the desired cutting line.

Furthermore, the cutting device may be designed such that the cutting head—in addition to the three linear axes in which it can be moved—may be rotated. For instance the cutting head may be rotatable around the axis defined by the propagation direction of the cutting beam and/or rotatable around transversally to said axis and/or rotatable around any other axis.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for cutting a material layer along a predetermined cutting line by means of a cutting beam, comprising:
   while impinging the cutting beam on the material layer, moving the cutting beam at a predetermined cutting speed, the cutting beam impinging on the material layer with a lateral offset, said offset delimited by a distance from the cutting line; and
   during said moving, automatically adjusting the distance of the offset based on at least one of i) variations of the cutting speed, and ii) deviations of an effective cross-section of the cutting beam from a circular shape.

2. The method according to claim 1, wherein the cross-section of the cutting beam is determined and a geometrical shape is assigned to the determined cross-section.

3. The method according to claim 2, wherein the geometrical shape is an ellipse or a sequence of a number of points.

4. The method according to claim 1, wherein the cutting line is composed of sections of different curvatures, and wherein the cutting speed and the distance are determined as a function of the curvatures.

5. The method according to o claim 1, wherein on a first section of the cutting line, the cutting beam is moved with a cutting speed V1 at a distance W1 and, on a second section of the cutting line that succeeds the first section, the cutting beam is moved with a cutting speed V2 at a distance W2, the distance W2 being set as follows:
   the distance W2 is set greater than the distance W1 when the cutting speed V2 is smaller than V1,
   the distance W2 is set smaller than the distance W1 when the cutting speed V2 is greater than V1.

6. The method according to claim 1, wherein the cutting beam is discharged from a cutting head, which is rotatable around at least one axis.

7. The method according to claim 6, wherein a geometrical shape is assigned to the effective cutting beam cross-section in function of the rotation angle by which the cutting beam is rotated around the at least one axis.

8. The method according to claim 1, wherein the cutting beam is inclined with respect to a vertical direction.

9. The method according to claim 8, wherein a geometrical shape is assigned to the effective cutting beam cross-section in function of the inclination angle by which the cutting beam is inclined with respect to the vertical direction.

10. The method according to claim 1, wherein the cutting beam is formed of at least one of a liquid, a gas and photons.

11. The method according to claim 1, wherein the cutting jet is a fluid jet.

12. The method according to claim 11, wherein the fluid jet is formed of a liquid which includes abrasive particles.

13. A cutting device, which is configured to implement the method according to claim 1, comprising a movable cutting head from which the cutting beam is discharged during the cutting process, the cutting device being equipped with a program on execution of which the method is implementable.

14. The cutting device according to claim 13, wherein the cutting head is rotatable around at least one axis.

15. The cutting device according to claim 13, further comprising a numerical control unit.

16. The method according to claim 1,
wherein the distance is determined as a function of variations of the cutting speed at which the cutting beam is moved, and
wherein, for a cutting line having at least one corner, the distance is varied at least when the material layer is cut along said at least one corner.

17. the method according to claim 1, wherein the cutting beam is discharged from a cutting head that is movable in three axes.

* * * * *